Figure 1:
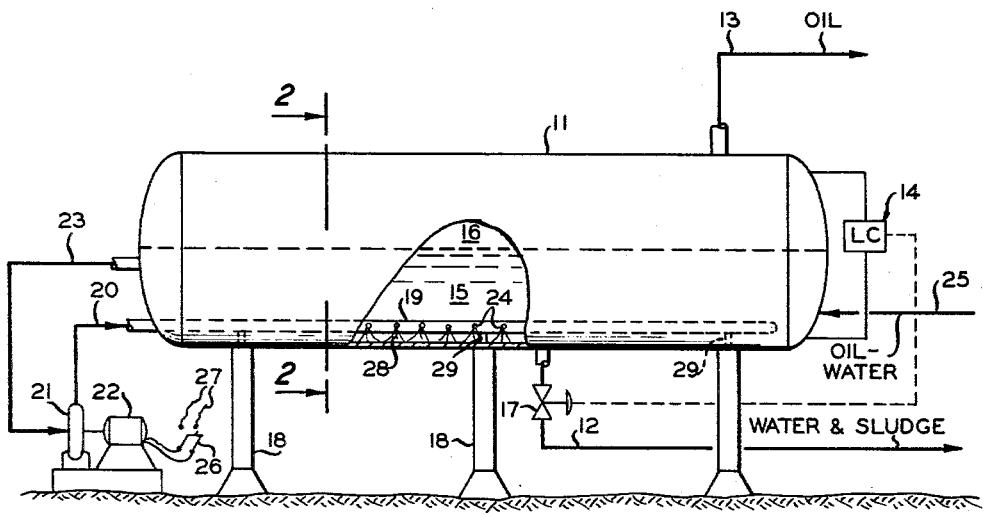

Jan. 12, 1965     L. H. VAUTRAIN ETAL     3,165,466

DESALTING APPARATUS

Filed June 2, 1961

INVENTORS
L.H. VAUTRAIN
M.L. LACEY
BY *Hudson & Young*

ATTORNEYS

United States Patent Office 3,165,466
Patented Jan. 12, 1965

3,165,466
DESALTING APPARATUS
Lucien H. Vautrain and Miles L. Lacey, both of Okmulgee, Okla., assignors to Phillips Petroleum Company, a corporation of Delaware
Filed June 2, 1961, Ser. No. 114,468
2 Claims. (Cl. 210—114)

This invention relates to desalting of crude oils containing salt. In one aspect it relates to the settling of an aqueous brine phase which contains added wash water and extracted salt water. In another aspect it relates to an apparatus for separating an aqueous brine phase from a crude oil to which has been added an aqueous soda ash solution for neutralizing acid constituents in the oil and for extracting salt therefrom.

Many crude oils as produced contain salt either as finely divided crystalline salt suspended in the oil or as aqueous brine droplets suspended in the oil. In some instances the finely divided crystalline salt is coated with wax thereby making the salt removal problem a difficult one.

Such crude oils containing salt in one form or another and containing acid are treated for removal of the salt and for neutralization of the acid. Dilute aqueous soda ash solutions are ordinarily used for neutralization of the acid content of the oil. Such a dilute solution serves the second purpose of washing or dissolving wax-free crystalline salts or aqueous solutions thereof from the oil. In case the salt is in the form of finely divided crystals the washing operation is usually carried out at a superatmospheric temperature so as to dissolve or melt any wax coating around the salt crystals. With the wax melted the salt crystals are freed therefrom because the melted wax is dissolved in the oil.

During treating of the oil with the aqueous soda ash solution a water-oil emulsion is frequently produced. Such an emulsion retards separation of the aqueous phase from the oil phase. In addition to the aqueous phase and the oil phase various types of solid material are usually present. This solid material is frequently called sediment or sludge. Such solid materials frequently serve the undesirable function of being emulsifying agents. One form or another of agitation is frequently employed in order to obtain thorough contact of the added aqueous solution and the oil in order to neutralize as nearly as possible the acid content of the oil and also to extract as nearly as possible aqueous brine particles and to dissolve as nearly completely as possible the free crystalline salt in the crude oil. Such agitation in the presence of sludge materials frequently forms emulsions of oil and water some of which are difficult to break.

In addition to the presence of sodium chloride brine, calcium and magnesium chloride brines are also sometimes present, particularly when oils have been produced from dolomitic formations following acidization with hydrochloric acid.

Since magnesium chloride and other magnesium salts hydrolyze in the presence of water with the formation of acid, the treatment of the oil with the soda ash solution neutralizes this acid of hydrolysis as well as any free unreacted hydrochloric acid remaining following the acidization.

We have found in settling tanks in which crude oils contain soda ash wash solutions, that after extended periods of operation sediment accumulates in the bottoms of the tanks. As the quantity or layer of sediment accumulates in the bottom of the tank and builds up, the useful volume of the tank is reduced thereby shortening the desired settling time. It is frequently desirable to settle the crude oil for a period of about 2 hours. Since the volume of the aqueous wash solution is much less than the volume of the oil pumped into the settler, the aqueous phase settling time is much longer than 2 hours. When the tank is, for example, one-fourth or one-third full of sediment, it is obvious that in order to maintain a predetermined aqueous phase settling time the rate of water addition must be slowed.

Accordingly, an object of this invention is to devise an apparatus for effectively settling aqueous solutions from aqueous solution-crude oil mixtures. Another object of this invention is to provide an apparatus whereby settled sediment or sludge material is disposed of or removed from the settling tank thereby providing for effective use of the tank volume to effect maximum separation of oil and aqueous phase by gravity. Yet another object of this invention is to provide an apparatus for removing sludge and sediment material from such an operation so as to obtain optimum settling times in the oil-water settler. Other objects and advantages of this invention will be realized upon reading the following description which, taken with the attached drawing, forms a part of this specification.

Figure 2:
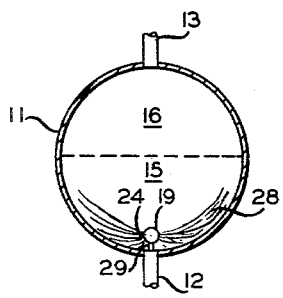
Figure 3:

In the drawing, FIGURE 1 illustrates in diagrammatic form an arrangement of apparatus parts for carrying out the process of this invention. FIGURE 2 is the sectional view taken on the line 2—2 of FIGURE 1. FIGURE 3 is the plan view of a portion of the apparatus of FIGURE 1.

In the drawing, reference numeral 11 identifies a horizontally positioned, elongated, settling tank such as frequently used in such settling operations. A conduit 12 communicates with the bottom of the tank for removal of settled aqueous phase. A throttle type motor valve 17 is installed in conduit 12 for regulation of the rate of withdrawal of the settled aqueous phase. Reference numeral 18 identifies tanks supports. Treated, washed and gravity separated oil is withdrawn from tank 11 through a conduit 13 for such subsequent treatment or use as desired. A liquid level controller apparatus 14 is provided as illustrated for operating the throttle valve 17 in response to the level of the aqueous phase in tank 11. This aqueous phase is identified by reference numeral 15 while the supernatant oil layer floating on the aqueous phase is identified by reference numeral 16. While this liquid level controller is herein termed a liquid level controller, it is in this particular case actually an interface controller. However, the terminology liquid level controller is correct because it regulates the level of the settled aqueous phase in the vessel. Upon raising of the float of the controller, the motor of the motor valve 17 is actuated to open the valve a little farther than previously and allow more rapid withdrawal of the settled aqueous phase. As the level of the aqueous phase drops, the float drops and the liquid level controller actuates the motor to throttle the valve 17 to restrict or reduce the rate of water removal. Such motor valves and level controllers are easily available from equipment supply houses.

During such settling operations as herein described solid sediment or sludge settles to the bottom of tank 11. Crude oils being treated in the manner herein described sometimes contain fairly large amounts of sediment and since such crude oil washing and settling operations are conducted for quite extended periods of time the matter of sludge or sediment accumulation in such settling tanks becomes a serious problem.

In order to solve this sludge accumulation problem we have positioned a sparge tube 19, that is, an elongated tube extending substantially the length of the vessel and at a level quite close to the bottom thereof. This tube is supported by supports 29 and contains a plurality of openings 24. A tube 23 or conduit communicates with tank 11 slightly below the desired oil-water interface in order to withdraw substantially only aqueous phase material and this conduit leads to the suction side of a pump 21. The discharge side of pump 21 is connected by a conduit 20 to the sparge tube 19. In this manner aqueous phase or water layer 15 is withdrawn through conduit 23 and is returned by way of pump 21 and conduit 20 to the sparge tube and this water is jetted or forced under pressure through jet openings 24 to maintain the sludge in suspension in the water phase 15. Pump 21 is preferably powered by an electric motor 22.

The sludge in the bottom of tank 11 is identified by reference numeral 28. FIGURE 2, which is essentially a cross section of tank 11 taken on the line 2—2 of FIGURE 1, shows the sparge tube having liquid jetted from jets 24 and maintaining sludge 28 in suspension in the aqueous phase 15. With the sludge in suspension and upon removal of aqueous phase through conduit 12, at least a portion of the sludge material is withdrawn.

In one instance prior to the use of our invention we have found that after a prolonged period of operation of a settling tank such as settling tank 11 sludge 28 accumulated in the tank to the depth of about 2 feet. It is obvious, then, that in such a tank which has a diameter of, for example, 6 feet, the presence of 2 feet of sludge markedly reduces the retention or settling time of the liquid contents therein.

*Specific Example*

In one instance in which the crude oil throughput in a 2000-barrel settler is about 600 barrels per hour of Oklahoma crude oil of about 35° API gravity, the retention time of the oil was about 1⅔ hours. This 1⅔ hour settling time was obtained when the oil-water interface was maintained at about the center of the tank vertically. This particular oil contained about 35 pounds of sodium chloride per 1000 barrels of oil and about 5 pounds of acid per 1000 barrels of oil as hydrochloric acid. To neutralize this acidity and to wash the salt from the crude oil about 24 barrels per hour of a 4 percent aqueous soda ash solution was thoroughly mixed with the oil prior to passage of the oil to the settler. Since the addition of this aqueous soda ash solution to the oil does not form a part of this invention, mixing apparatus for obtaining intimate contact of the aqueous solution with the oil is not shown. However, a conduit 25 leads or conducts the mixture from a mixing apparatus, not shown, as charge material to tank 11. Also a heating means is provided along with the mixing operation in order to melt any wax which happens to enclose salt crystals and to assist in the separation of the aqueous phase from the oil phase in tank 11. Such heating frequently is carried out at a temperature of about 200° F. Pressure on the mixing system and in tank 11 is such as to maintain all contents in the liquid phase. By the use of a 240-gallon per minute 60 foot head sludge booster pump for an 8-hour period once each week, we found that there is not a sludge build-up in the bottom of the settling tank. To make the operation as simple as possible a manually operable switch 26 is provided in the electrical leads 27 for actuation of the motor 22 for powering the pump 21. Thus by manually closing this switch 26 for such a period and pumping about 240 gallons per minute of the aqueous phase and jetting this amount of liquid through jets 24 of sparge tube 19, the sludge 28 is maintained in suspension in the aqueous phase. During this period water or aqueous phase withdrawn through conduit 12 contains this suspended sludge material. Also since the sludge, or at least portions thereof, settles fairly slowly, some of the sludge is maintained in suspension after the closing off of pump 21 and thus some of the sludge is withdrawn through conduit 12 with the water even after pump 21 has been closed down.

While we employed or operated pump 21 for an 8-hour period once each week other operating intervals are found to be effective. For example, the recirculation and jetting can be carried out for an hour or two each day or two.

In one instance the sparge tube 19 was a 2-inch diameter pipe extending substantially the full length of tank 11 as illustrated in FIGURE 1. This particular tube or pipe contained about 20 openings of about ½-inch diameter. It was found that with such a sparge tube 20 with half-inch openings and with pump 21 circulating about 240 gallons of aqueous phase per minute, sufficient velocity was maintained through jet openings 24 as to stir the contents in the bottom of the tank sufficiently that the sludge was placed in proper suspension for removal with water withdrawn from the tank through conduit 12.

Prior to installation of this invention in tank 11, water or aqueous phase was at all times withdrawable through conduit 12 but the sludge built up on the bottom of the tank and the only sludge which was withdrawn was that in the immediate vicinity of the inlet to conduit 12.

While the sparge tube 19 used in this particular tank was a 2-inch pipe containing about 20 openings of ½-inch diameter it is realized that in larger settling tanks larger sparge tubes with a larger number of openings are required. Openings are of such number and size as to give sufficient velocity of the recirculating water that the sludge is stirred sufficiently for suspension in the aqueous phase. In some instances when tank 11 is possibly of larger diameter and vertically disposed, more than one sparge tube might be required. In this case conduit 20 would feed into a header and several sparge tubes connected with this header at spaced intervals for proper agitation of liquid and sludge on the bottom of the tank.

Agitation obviously should not be so vigorous as to interfere with proper separation of the aqueous and oil phases.

This settling tank 11 or desalting tank can be a simple hollow tank as illustrated in the drawing. However, the tank also can be a tank equipped with electrostatic plates or grids adapted for promotion of coagulation of the material desired to be separated from the crude oil. Ordinarily there is a layer of emulsion in such a settling tank between the aqueous phase and the oil phase. Also in some instances, chemicals are added to the oil entering tank 11 to promote breaking of the emulsion.

While certain embodiments of the invention have been described for illustrative purposes, the invention obviously is not limited thereto.

We claim:

1. Apparatus comprising in combination:
   - (a) a horizontally elongated sealed settling tank, having an inlet in one end at an intermediate level for a mixed stream of oil, salt water, and sludge material, an outlet for oil in its top section, and an outlet line connecting with the tank bottom intermediate its ends for salt water and sludge removal;
   - (b) a liquid level controller on said tank and a motor valve in the outlet salt water and sludge line, said controller being sensitive to the salt water level in said tank and being in control of said motor valve;
   - (c) a circulation line leading from a level in said tank just below the controlled salt water level to a level adjacent the bottom of said tank;
   - (d) a fixed perforate conduit extending longitudinally and internally of said tank substantially the length thereof adjacent its bottom connected with the lower end of the line of (c), the lower section of said tank between said perforate conduit and the outlet for salt water and sludge being unobstructed to permit free flow of salt water and sludge to the outlet line of (a); and
   - (e) pumping means in the line of (c) for circulating salt water from its upper end thru said perforate conduit.

2. Apparatus comprising in combination:
   - (a) a horizontally elongated sealed settling tank, having an inlet in one end at an intermediate level for a mixed stream of oil, salt water, and sludge material, an outlet for oil in its top section, and an outlet line, having a valve therein, connecting with the tank bottom intermediate its ends for salt water and sludge removal;

(b) means for maintaining a liquid level adjacent the longitudinal center line of said tank comprising a liquid level controller sensitive to liquid at said level and in operative control of the valve of (a);

(c) a circulation line leading from a level in said tank just below the controlled salt water level externally of said tank to a level adjacent the bottom of said tank;

(d) a fixed perforate conduit extending longitudinally and internally of said tank substantially from end to end thereof adjacent its bottom connected with the lower end of the line of (c), the lower section of said tank between said perforate conduit and the outlet line of (a) being unobstructed to permit free flow of salt water and sludge to the outlet line of (a); and (e) pumping means in the line of (c) for circulating salt water from its upper end thru said perforate conduit.

References Cited in the file of this patent
UNITED STATES PATENTS

| | | |
|---|---|---|
| 1,135,080 | Vandercook | Apr. 13, 1915 |
| 1,806,698 | Miller | May 26, 1931 |
| 2,267,608 | Hawley | Dec. 23, 1941 |
| 2,427,886 | Walker | Sept. 23, 1947 |
| 2,531,547 | Ayres | Nov. 28, 1950 |
| 2,620,926 | Helbig | Dec. 9, 1952 |
| 2,685,938 | Walker et al. | Aug. 10, 1954 |
| 2,785,055 | Redcay | Mar. 12, 1957 |